United States Patent
Nihei et al.

(10) Patent No.: US 12,155,874 B2
(45) Date of Patent: Nov. 26, 2024

(54) COMMUNICATION CONTROL METHOD, COMMUNICATION SYSTEM, AND TRANSMISSION APPARATUS

(71) Applicant: NEC Corporation, Tokyo (JP)

(72) Inventors: Koichi Nihei, Tokyo (JP); Takanori Iwai, Tokyo (JP)

(73) Assignee: NEC CORPORATION, Tokyo (JP)

(*) Notice: Subject to any disclaimer, the term of this patent is extended or adjusted under 35 U.S.C. 154(b) by 5 days.

(21) Appl. No.: 18/017,453

(22) PCT Filed: Jul. 29, 2020

(86) PCT No.: PCT/JP2020/029091
§ 371 (c)(1),
(2) Date: Jan. 23, 2023

(87) PCT Pub. No.: WO2022/024268
PCT Pub. Date: Feb. 3, 2022

(65) Prior Publication Data
US 2023/0283818 A1   Sep. 7, 2023

(51) Int. Cl.
*H04N 21/238* (2011.01)
*H04N 21/24* (2011.01)

(52) U.S. Cl.
CPC ....... *H04N 21/238* (2013.01); *H04N 21/2402* (2013.01)

(58) Field of Classification Search
CPC ............ H04N 21/238; H04N 21/2402; H04N 21/21805; H04N 23/90; H04N 7/181; H04N 7/18
See application file for complete search history.

(56) References Cited

U.S. PATENT DOCUMENTS

| | | | | |
|---|---|---|---|---|
| 2015/0304737 | A1* | 10/2015 | Franklin | H04N 21/6543 |
| 2016/0173805 | A1* | 6/2016 | Claus | H04N 5/44 |
| 2017/0061214 | A1* | 3/2017 | Huang | H04N 7/181 |
| 2018/0334099 | A1 | 11/2018 | Gao et al. | |

FOREIGN PATENT DOCUMENTS

| | | |
|---|---|---|
| JP | 2005-051517 A | 2/2005 |
| JP | 2014-071778 A | 4/2014 |
| JP | 2016-134816 A | 7/2016 |
| WO | 2013/099488 A1 | 7/2013 |
| WO | 2020/090285 A1 | 5/2020 |

OTHER PUBLICATIONS

International Search Report for PCT Application No. PCT/JP2020/029091, mailed on Oct. 27, 2020.

* cited by examiner

*Primary Examiner* — Anthony Bantamoi
(74) *Attorney, Agent, or Firm* — Sughrue Mion, PLLC

(57) ABSTRACT

An object of the present disclosure is to provide a communication control method capable of preventing excessive bandwidth allocation to a specific apparatus. A communication control method according to the present disclosure includes: estimating a quality of experience of a monitoring person who monitors videos displayed on a monitoring apparatus (30) that has received video data of the videos captured by a plurality of imaging apparatuses (20) via a network (40), when viewing the videos; and controlling communication for transmitting the video captured by each of the imaging apparatuses (20) to the monitoring apparatus via the network based on the estimated quality of experience.

18 Claims, 10 Drawing Sheets

COMMUNICATION CONTROL METHOD, COMMUNICATION SYSTEM, AND TRANSMISSION APPARATUS

This application is a National Stage Entry of PCT/JP2020/029091 filed on Jul. 29, 2020, the contents of all of which are incorporated herein by reference, in their entirety.

TECHNICAL FIELD

The present disclosure relates to a communication control method, a communication system, and a transmission apparatus.

BACKGROUND ART

In recent years, self-driving technology has been developed and self-driving vehicles have been tested on public roads. Usually, a self-driving vehicle has various sensors mounted thereon for recognizing the peripheral state of the vehicle such as the presence or the absence of a pedestrian and the presence or the absence of another vehicle. Examples of the various sensors include cameras, radars, and light detection and ranging (LiDAR). Information detected by the various sensors is used in performing driving control and remote monitoring.

Patent Literature 1 describes that a communication apparatus determines a priority level of each camera mounted on a vehicle, and allocates, to each camera, a bandwidth for transmitting a video to a server device, in accordance with the priority level.

CITATION LIST

Patent Literature

Patent Literature 1: International Patent Publication No. WO2020/090285

SUMMARY OF INVENTION

Technical Problem

However, in a case where a bandwidth is allocated in accordance with a priority level of each of a plurality of cameras as in the communication apparatus disclosed in Patent Literature 1, there is a problem that there is a high possibility that an excessive bandwidth is allocated to a camera with a high priority level.

An object of the present disclosure is to provide a communication control method, a communication system, and a transmission apparatus capable of preventing excessive bandwidth allocation to a specific apparatus.

Solution to Problem

A communication control method according to a first aspect of the present disclosure includes: estimating a quality of experience of a monitoring person who monitors videos displayed on a monitoring apparatus that has received video data of the videos captured by a plurality of imaging apparatuses via a network, when viewing the videos; and controlling communication for transmitting the video captured by each of the imaging apparatuses to the monitoring apparatus via the network based on the estimated quality of experience.

A communication system according to a second aspect of the present disclosure includes: a transmission apparatus configured to transmit, via a network, video data of videos captured by a plurality of imaging apparatuses; and a monitoring apparatus configured to display the videos received via the network, in which the transmission apparatus estimates a quality of experience of a monitoring person who monitors the videos when viewing the videos, and controls communication for transmitting the video captured by each of the imaging apparatuses to the monitoring apparatus via the network based on the estimated quality of experience.

A transmission apparatus according to a third aspect of the present disclosure includes: an estimation unit configured to estimate a quality of experience of a monitoring person who monitors videos displayed on a monitoring apparatus that has received video data of the videos captured by a plurality of imaging apparatuses via a network, when viewing the videos; and a control unit configured to control communication for transmitting the video captured by each of the imaging apparatuses to the monitoring apparatus via the network based on the estimated quality of experience.

Advantageous Effects of Invention

According to the present disclosure, it is possible to provide a communication control method, a communication system, and a transmission apparatus capable of preventing excessive bandwidth allocation to a specific apparatus.

EXAMPLE EMBODIMENT

First Example Embodiment

Figure 1:
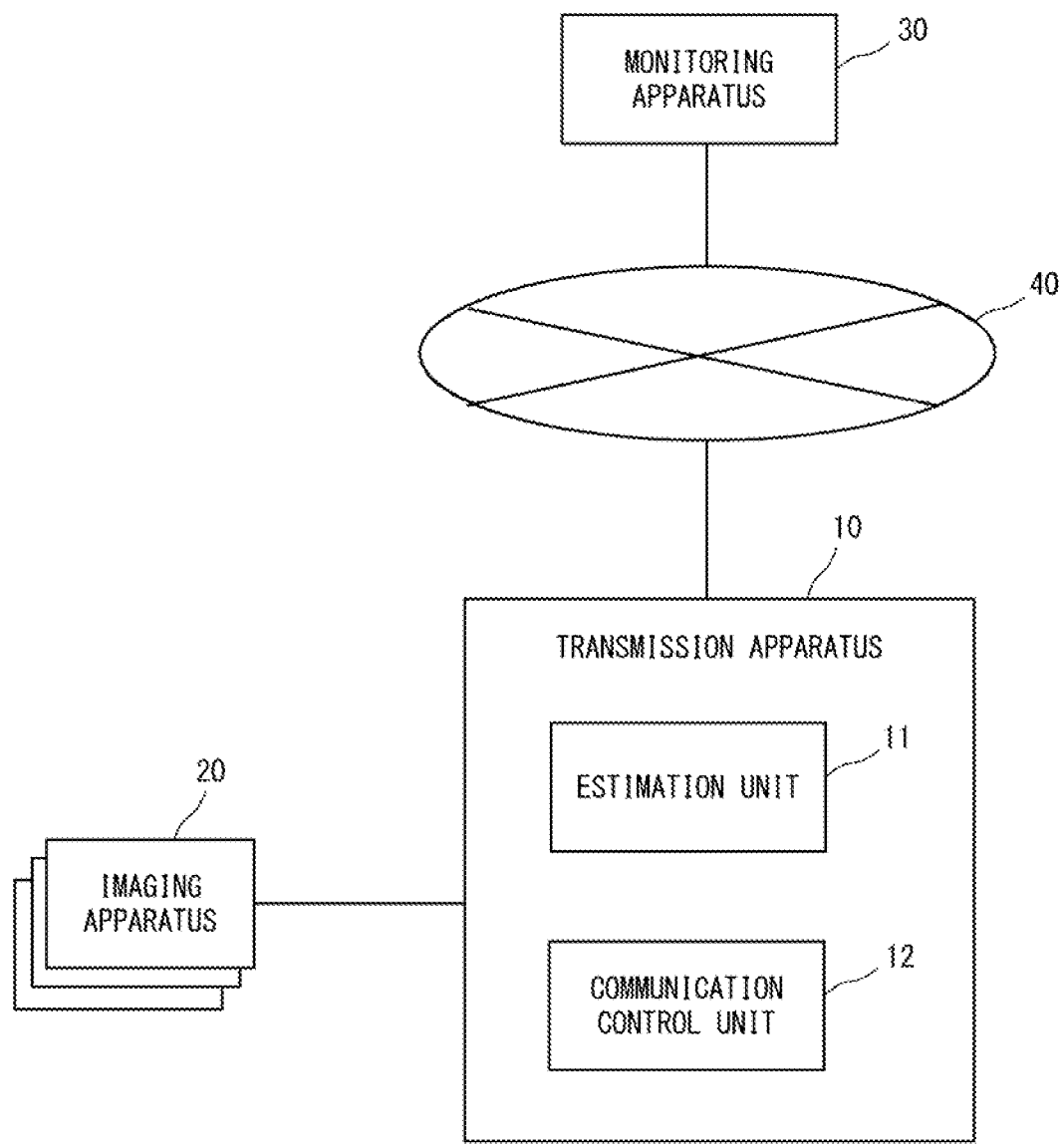
FIG. 1 is a configuration diagram of a communication system according to a first example embodiment.

Example embodiments of the present disclosure are described below with reference to the drawings. A configuration example of a communication system according to a first example embodiment will be described with reference to FIG. 1. The communication system of FIG. 1 includes a transmission apparatus 10, imaging apparatuses 20, and a monitoring apparatus 30. The transmission apparatus 10 communicates with the monitoring apparatus 30 via a network 40.

The transmission apparatus 10, the imaging apparatus 20, and the monitoring apparatus 30 may be computer apparatuses that operate when a processor executes a program stored in a memory. The network 40 may be, for example, an IP network. Alternatively, the network 40 may be a communication network managed by a telecommunications carrier. The communication network managed by the telecommunications carrier may be referred to as a mobile network. The transmission apparatus 10 may be connected to the network 40 via a radio communication line. Connection of the transmission apparatus 10 to the network 40 indicates a state in which the transmission apparatus 10 can communicate with the network 40.

Next, a configuration example of the transmission apparatus 10 will be described. The transmission apparatus 10 includes an estimation unit 11 and a communication control unit 12. The constituent component of the transmission apparatus 10 such as the estimation unit 11 or the communication control unit 12 may be a software component or a module whose processing is carried out by causing the processor to execute the program stored in the memory. Alternatively, the constituent component of the transmission apparatus 10 may be a hardware component such as a circuit or a chip.

The estimation unit 11 estimates a quality of experience of a monitoring person who monitors videos displayed on the monitoring apparatus 30 that has received video data of the videos captured by the plurality of imaging apparatuses via the network 40, when viewing the video.

The imaging apparatus 20 may be, for example, a camera apparatus. Although the transmission apparatus 10 and the imaging apparatus 20 are shown as different apparatuses in FIG. 1, the imaging apparatus 20 may be mounted on the transmission apparatus 10. That is, the transmission apparatus 10 and the imaging apparatus 20 may be an integrated apparatus. Furthermore, although FIG. 1 shows a configuration in which a plurality of imaging apparatuses 20 are connected to the transmission apparatus 10 via one communication line, a communication line may be set for each imaging apparatus 20.

The video may be, for example, a moving image or a still image. The monitoring apparatus 30 reproduces the video by using the received video data. The video data may be referred to as a video file, a video frame, or the like.

For example, in a case where the video data is received from each of the plurality of imaging apparatuses 20, the monitoring apparatus 30 may display the video captured by each imaging apparatus 20 on a display unit such as a display. That is, the monitoring apparatus 30 may divide a display region of the display and simultaneously display the videos captured by the respective imaging apparatuses 20. Alternatively, the monitoring apparatus 30 may combine the pieces of video data from the plurality of imaging apparatuses 20 and display the combined video data as one video. At this time, display sizes of all the pieces of video data may be the same, or the display size may be different for each piece of video data. In addition, the monitoring apparatus 30 may delete a partial region from the video and display the video without the partial region on the display unit.

The quality of experience is one of indices indicating a quality of the video displayed by the monitoring apparatus 30, and is an index indicating subjective evaluation by the monitoring person.

The communication control unit 12 controls communication for transmitting the video captured by each imaging apparatus 20 to the monitoring apparatus 30 via the network 40 based on the estimated quality of experience.

Controlling communication may mean, for example, determining an encoding parameter of the video data to be transmitted to the monitoring apparatus 30. Examples of the encoding parameter may include a bandwidth to be allocated to transmission of the video data. For example, the communication control unit 12 may determine the encoding parameter in such a way as to improve the quality of experience of the monitoring person.

The communication control unit 12 may control communication based on the quality of experience regarding the video captured by each imaging apparatus 20, the quality of experience being estimated by the estimation unit 11. Alternatively, the communication control unit 12 may control communication based on the quality of experience estimated by the estimation unit 11 in comprehensive consideration of the videos captured by the respective imaging apparatuses 20.

Estimating the quality of experience in comprehensive consideration of the videos captured by the respective imaging apparatuses 20 may be estimating the quality of experience of the monitoring person who simultaneously views the videos captured by the plurality of imaging apparatuses 20. Generally, when the monitoring person simultaneously views a plurality of videos, in a case where only a quality of a video captured by one imaging apparatus 20 is high and qualities of videos captured by other imaging apparatuses 20 are low, the quality of experience of the monitoring person may not be high. In such a case, it is necessary to improve the overall quality of the videos captured by the plurality of imaging apparatuses 20 in order to improve the quality of experience of the monitoring person.

For example, the quality of experience of the monitoring person who simultaneously views the videos captured by the plurality of imaging apparatuses may be the sum of the qualities of experience of the monitoring person who views the respective videos. In this case, the quality of experience for each video may be weighted when adding up the qualities of experience for the respective videos. A weighted value may be determined according to priority information of each video, for example.

Figure 2:
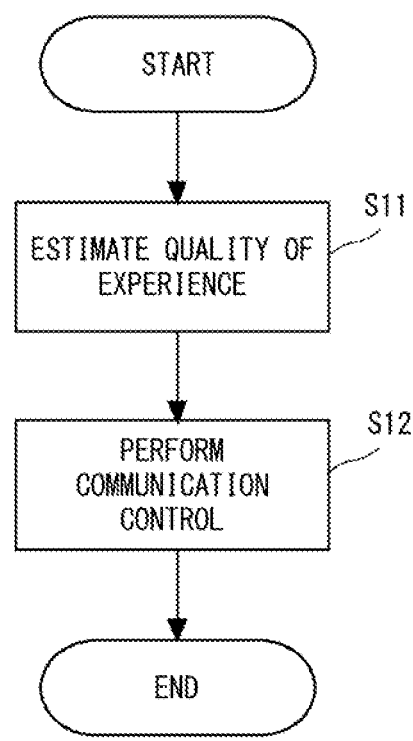
FIG. 2 is a diagram showing a flow of communication control processing according to the first example embodiment.

Next, a flow of communication control processing in the transmission apparatus 10 according to the first example embodiment will be described with reference to FIG. 2. First, the estimation unit 11 estimates the quality of experience of the monitoring person who monitors the videos displayed on the monitoring apparatus 30 that has received the video data of the videos captured by the plurality of imaging apparatuses 20 via the network 40, when viewing the videos (S11).

Next, the communication control unit 12 controls communication for transmitting the video captured by each imaging apparatus 20 to the monitoring apparatus 30 via the network 40 based on the estimated quality of experience (S12).

As described above, the transmission apparatus 10 according to the first example embodiment controls communication for transmitting the video data based on the quality of experience of the monitoring person who monitors the videos displayed on the monitoring apparatus 30 connected via the network 40 when viewing the videos. In addition, the quality of experience of the monitoring person is quality for the images captured by the plurality of imaging apparatuses 20. Therefore, the communication control unit 12 does not determine the encoding parameter in such a way that only video data of a specific imaging apparatus 20 has a high quality, but determines the encoding parameter in such a way as to improve the qualities of all pieces of video data captured by the imaging apparatuses 20. As a result, the communication control unit 12 can avoid excessive bandwidth allocation for transmitting the video data of the specific imaging apparatus 20, and can perform bandwidth allocation in such a way as to improve the qualities of all pieces of video data.

Second Example Embodiment

Figure 3:
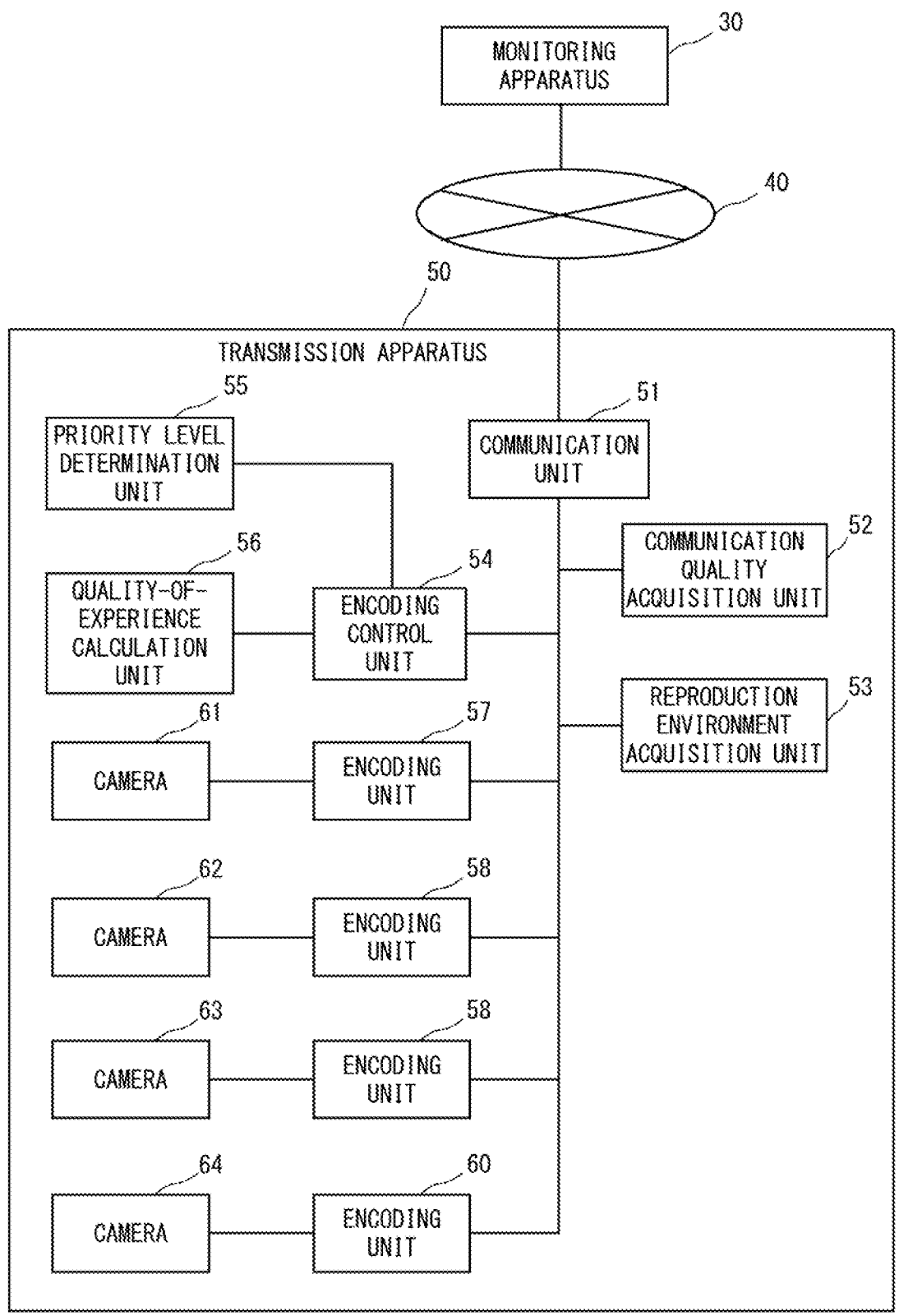
FIG. 3 is a configuration diagram of a transmission apparatus according to a second example embodiment.

Next, a configuration example of a transmission apparatus 50 according to a second example embodiment will be described with reference to FIG. 3. The transmission apparatus 50 corresponds to the transmission apparatus 10 of FIG. 1. The transmission apparatus 50 includes a communication unit 51, a communication quality acquisition unit 52, a reproduction environment acquisition unit 53, an encoding control unit 54, a priority level determination unit 55, a quality-of-experience calculation unit 56, encoding units 57 to 60, and cameras 61 to 64.

Figure 4:
FIG. 4 is a diagram showing a control image of a vehicle according to the second example embodiment.

The transmission apparatus 50 may be mounted on a mobile body. Examples of the mobile body may include a vehicle. Examples of the vehicle may include a self-driving vehicle that is autonomously driven without being operated by a driver, or may be a vehicle for which remote monitoring or driving assistance is performed. For example, as shown in FIG. 4, the vehicle may be automatically driven or remotely monitored via the Internet. Further, as shown in FIG. 4, the quality of experience of the monitoring person who monitors the video captured by the imaging apparatus (camera) mounted on the vehicle as the video displayed on the monitoring apparatus received via the Internet is estimated. FIG. 4 shows a case where the quality of experience is estimated in an apparatus different from the vehicle. However, as described below, the quality of experience may be estimated in the transmission apparatus 50 mounted on the vehicle. The cameras 61 to 64 may capture images of the surroundings of the vehicle. Specifically, the cameras 61 to 64 may be attached at positions where it is possible to perform imaging in front, rear, left, and right directions of the vehicle. FIG. 3 shows a configuration in which the cameras 61 to 64 are used integrally with the transmission apparatus 50.

The encoding control unit 54 corresponds to the communication control unit 12 of FIG. 1. The quality-of-experience calculation unit 56 corresponds to the estimation unit 11 of FIG. 1. In FIG. 3, functions or operations different from those of the transmission apparatus 10 of FIG. 1 will be mainly described, and a detailed description regarding functions or operations similar to those of the transmission apparatus 10 of FIG. 1 will be omitted.

The communication unit 51 communicates with the monitoring apparatus via the network 40. Furthermore, the communication unit 51 communicates with the network 40 via a radio communication line. That is, the communication unit 51 transmits a radio frame to the network 40 and receives a radio frame from the network 40. For example, the communication unit 51 may perform wireless communication by using a wireless communication standard such as long term evolution (LTE) or 5th generation (5G) defined in the 3rd generation partnership project (3GPP).

The communication quality acquisition unit 52 acquires information regarding a quality of a communication path between the transmission apparatus 50 and the monitoring apparatus 30 from the monitoring apparatus 30 via the communication unit 51. For example, information regarding a transmission time from when the transmission apparatus 50 transmits the video data to when the monitoring apparatus 30 receives the video data may be acquired.

The communication quality acquisition unit 52 calculates a bit rate at which transfer can be performed by the transmission apparatus 50 by using a data size of the video data transmitted to the monitoring apparatus 30 and the transmission time related to the video data. The bit rate indicates the amount of data that can be transferred per unit time. The bit rate may be referred to as a channel capacity, a bandwidth, or simply a band. Furthermore, the bit rate calculated by the communication quality acquisition unit 52 may be referred to as an available bandwidth. The communication quality acquisition unit 52 outputs information regarding the calculated bit rate to the encoding control unit 54. The calculation of the bit rate may be performed in the monitoring apparatus 30, and in this case, the communication quality acquisition unit 52 of the transmission apparatus 50 may acquire the result via the communication unit 51.

The reproduction environment acquisition unit 53 acquires information regarding a reproduction environment in the monitoring apparatus 30 from the monitoring apparatus 30 via the communication unit 51. For example, the information regarding the reproduction environment may be information regarding screen display in the monitoring apparatus 30, a line of sight of the monitoring person, a reproduction delay, and the like. Examples of the information regarding the screen display may include information regarding the presence or absence of display of camera videos captured by the cameras 61 to 64, a display size of the camera video on the screen, a difference in display size of each camera video, a distance from the screen to the monitoring person, and the like. Examples of the information regarding the line of sight of the monitoring person may include information regarding whether or not the monitoring person is gazing at the screen. Whether or not the monitoring person is gazing at the screen may be detected by, for example, a sensor that tracks the line of sight.

The reproduction environment acquisition unit 53 outputs the information regarding the reproduction environment to the encoding control unit 54.

The priority level determination unit 55 determines priority information of a plurality of cameras. For example, the priority level determination unit 55 determines priority levels of the cameras 61 to 64. The priority level of each camera may be determined based on a traveling direction of the vehicle. The traveling direction of the vehicle may be determined based on, for example, shift lever information of the vehicle. Further, it is possible to determine whether the vehicle turns right or left by using steering wheel information or blinker information of the vehicle. Alternatively, the priority level determination unit 55 may acquire information regarding the traveling direction of the vehicle from software that assists driving such as a car navigation system.

For example, a priority level of a camera that captures the traveling direction of the vehicle may be set higher than those of other cameras. Specifically, when the vehicle is moving forward, a priority level of a camera that images an area in front of the vehicle may be set higher than those of other cameras. Furthermore, in a case where the vehicle turns right, a priority level of a camera that images an area on the right side of the vehicle may be set higher than those of the other cameras.

Furthermore, the priority level of each camera may be determined according to an object appearing in the video captured by each camera. For example, in a case where another vehicle, a pedestrian, an obstacle, a traffic signal, or a traffic sign appears in a captured video, a priority level of a camera that has captured the video may be set higher than those of the other camera. Alternatively, the priority level determination unit 55 may determine the priority level according to the type of lens used for the camera. For example, in a case where the vehicle is stopped or departs, the priority level determination unit 55 may increase a priority level of a camera that uses a fisheye lens that enables checking of a wide range.

For example, the priority level determination unit 55 may set a priority level of a camera with the highest priority among the cameras 61 to 64 to 4, may set a priority level of a camera with the second highest priority to 3, and may set a priority level of a camera with the third highest priority to 2. The priority level determination unit 55 may set a priority of a camera with the lowest priority to 1. The priority level values 1 to 4 determined by the priority level determination unit 55 are examples, and the priority level may be set to other numerical values. Further, the priority level determination unit 55 may calculate a new priority level P as P=m(p) by using a determined priority level value p and an arbitrary monotone increasing function m(x). That is, the priority level determination unit 55 may convert the priority level p to the new priority level P by using the arbitrary monotone increasing function m(x). As a result, for example, it is possible to increase or decrease a difference between numerical values set for the priority level of the camera with the highest priority and the priority levels of other cameras. The priority level determination unit 55 outputs the determined priority p or P to the encoding control unit 54.

The encoding control unit 54 outputs the information acquired from the communication quality acquisition unit 52 and the reproduction environment acquisition unit 53 to the quality-of-experience calculation unit 56. Furthermore, the encoding control unit 54 may output, to the quality-of-experience calculation unit 56, a bit rate allocated to the cameras 61 to 64, a frame rate, a resolution, and a codec type. The resolution may be a resolution of the video data applied when the transmission apparatus 50 transmits the video data to the monitoring apparatus 30. For example, in a case where a bit rate allocated to a camera is lowered, the encoding control unit 54 may lower at least one of a frame rate or a resolution when transmitting video data of a video captured by the camera to the monitoring apparatus 30 in order to improve the quality of experience. Furthermore, the encoding control unit 54 may output installation locations of the cameras 61 to 64, orientations of the cameras 61 to 64, camera types, a vehicle speed, operation information of the vehicle, and the like to the quality-of-experience calculation unit 56.

The quality-of-experience calculation unit 56 calculates a quality q of experience by using the information acquired from the encoding control unit 54 as a parameter. For example, the quality q of experience may be defined as $q=f(x_1, x_2, \ldots, x_N)$ using a certain function $f(x_1, x_2, \ldots, x_N)$ (N is an integer of 1 or more). In this case, the quality q of experience may be calculated by setting the information acquired from the encoding control unit 54 as a parameter of $f(x_1, x_2, \ldots, x_N)$.

For example, an equation defined in ITU-T G. 1070 may be used for $q=f(x_1, x_2, \ldots, x_N)$ for calculating the quality q of experience. Since the equation defined in ITU-T G. 1070 is a known equation, a detailed description thereof will be omitted.

Alternatively, the monitoring person may perform in advance a subjective evaluation experiment of evaluating the quality of the video by viewing the video in which the parameter acquired by the quality-of-experience calculation unit 56 is changed, and model a relationship between the parameter and the quality q of experience by using the experiment result. Machine learning such as deep learning may be used for this modeling. Once the information is acquired from the encoding control unit 54, the quality-of-experience calculation unit 56 may determine the quality q of experience by using a model generated in advance.

The quality-of-experience calculation unit 56 outputs the calculated quality q of experience to the encoding control unit 54.

The encoding control unit 54 determines the encoding parameter by using the quality q of experience acquired from the quality-of-experience calculation unit 56 and the priority level p acquired from the priority level determination unit 55.

For example, the encoding control unit 54 defines an objective function A1 as in the following Equation (1). $p_i$ indicates a priority level of a camera i, and $q_i$ indicates a quality of experience for the camera i. The quality of experience for the camera i is a quality of experience evaluated by the monitoring person who views a video captured by the camera i. n indicates the number of cameras (n is an integer of 1 or more).

[Equation 1]

$$A1 = \max \Sigma_{i=1}^{n} p_i q_i \qquad (1)$$

Further, the encoding control unit 54 defines a constraint condition B as in the following Equation (2). $r_i$ indicates a bit rate of the camera i, and C indicates an available bandwidth.

[Equation 2]

$$B = \Sigma_{i=1}^{n} r_i \leq C \qquad (2)$$

The encoding control unit 54 may determine the encoding parameter in such a way that A1 is maximized under the constraint condition B.

Figure 5:
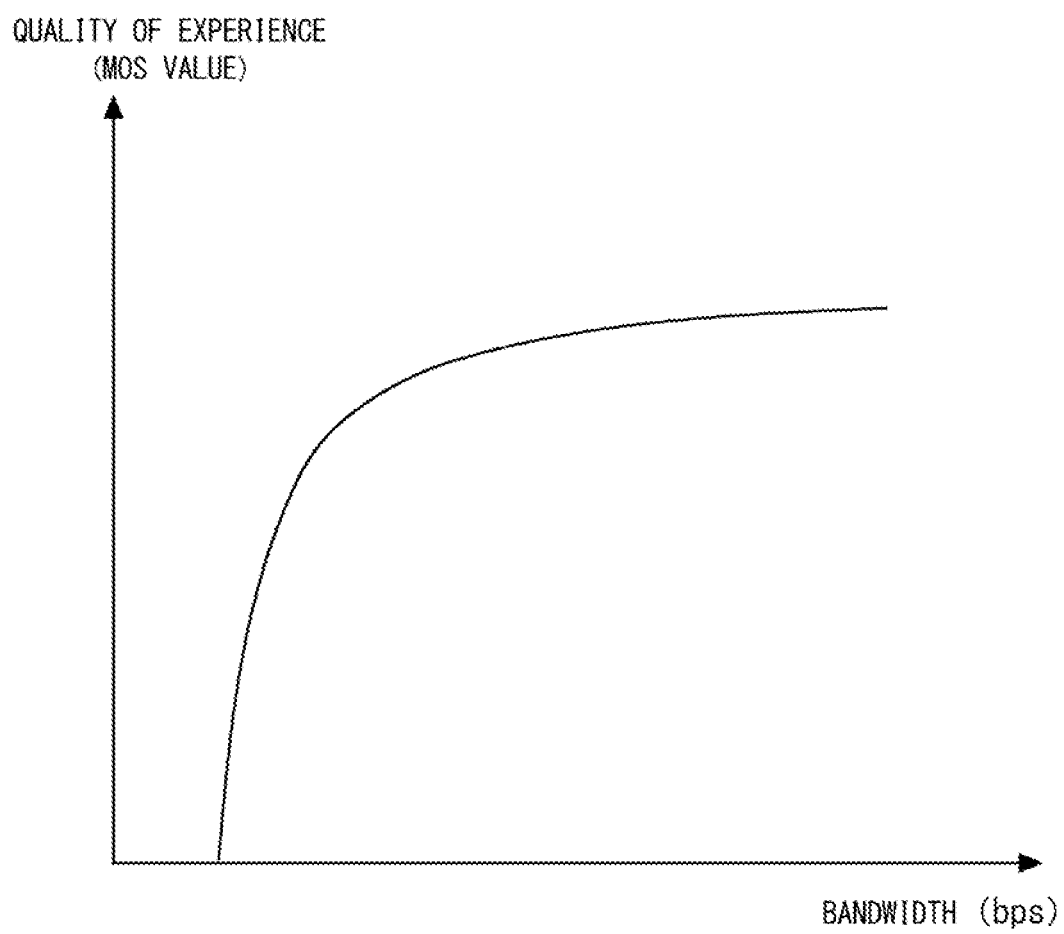
FIG. 5 is a diagram showing transition of a quality of experience according to the second example embodiment.

For example, it may be assumed that the bit rate (bandwidth) allocated to each camera and the quality of experience of the monitoring person who views each camera change as shown in FIG. 5. The horizontal axis in FIG. 5 indicates the bit rate allocated to each camera in bits per second (bps). The vertical axis indicates the quality of experience of the monitoring person who views the video by using a Mean Opinion Score (MOS) value. Allocating a bit rate to a camera may be rephrased as setting a bit rate to be applied when video data of a video captured by the camera is transmitted to the monitoring apparatus 30.

FIG. 5 shows that a variation (inclination) in quality of experience is large in a low bit rate region, while a variation (inclination) in quality of experience is small in a high bit rate region. That is, FIG. 5 shows that the increase in bit rate and the increase in quality of experience are not proportional to each other. Furthermore, a relationship between the bit rate and the quality of experience is not limited to the graph of FIG. 5, and may be determined by another graph indicating a relationship in which the increase in bit rate and the increase in quality of experience are not proportional to each other.

Returning to FIG. 3, the encoding control unit 54 may change the value of the quality q of experience by changing the bit rate to be allocated to each camera as the encoding parameter, and may determine the bit rate to be allocated to each camera in such a way that the value of A1 in Equation (1) is maximized. The sum of the bit rates allocated to the respective cameras is in accordance with the constraint condition B of Equation (2). Furthermore, the encoding control unit 54 may determine at least one of the frame rate or the resolution to be applied to the video data of the video captured by each camera according to the determined bit rate. The encoding parameters controlled by the encoding control unit 54 include the bit rate, and may further include the frame rate and the resolution.

The encoding control unit 54 outputs the determined encoding parameter of the camera 61 to the encoding unit 57. Further, the encoding control unit 54 outputs the determined encoding parameter of the camera 62 to the encoding unit 58, outputs the determined encoding parameter of the camera 63 to the encoding unit 59, and outputs the determined encoding parameter of the camera 64 to the encoding unit 60.

Each of the cameras 61 to 64 outputs the video data of the captured video to each of the encoding units 57 to 60. The encoding unit 57 outputs, to the communication unit 51, the video data to which the bit rate, the frame rate, and the resolution are applied as the encoding parameters acquired from the encoding control unit 54, for example. Similarly, the encoding units 58 to 60 output, the communication unit 51, the video data to which the encoding parameters acquired from the encoding control unit 54 are applied. The communication unit 51 transmits the video data acquired from the encoding units 57 to 60 to the monitoring apparatus 30 via the network 40.

Figure 6:
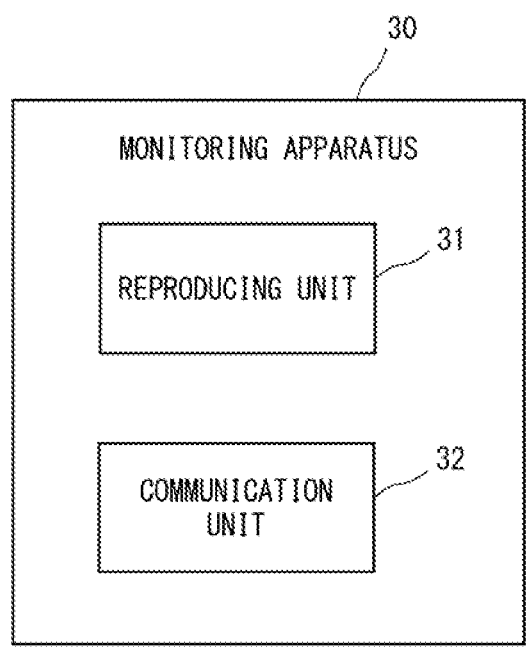
FIG. 6 is a diagram of a monitoring apparatus according to the second example embodiment.

Next, a configuration example of the monitoring apparatus 30 will be described with reference to FIG. 6. The monitoring apparatus 30 includes a reproducing unit 31 and a communication unit 32. The constituent component of the monitoring apparatus 30 such as the reproducing unit 31 or the communication unit 32 may be a software component or a module whose processing is carried out by causing the processor to execute the program stored in the memory. Alternatively, the constituent component of the monitoring apparatus 30 may be a hardware component such as a circuit or a chip.

The communication unit 32 outputs the video data received from the transmission apparatus 50 to the reproducing unit 31. The reproducing unit 31 reproduces the acquired video data, and displays the video on a display or the like that is built in the monitoring apparatus 30 or used integrally with the monitoring apparatus 30. The monitoring person views the video displayed on the display. Furthermore, the reproducing unit 31 transmits the information regarding the screen display to the transmission apparatus 50 via the communication unit 32.

Next, a flow of communication control processing in the transmission apparatus 50 according to the second example embodiment will be described with reference to FIG. 7. First, the communication quality acquisition unit 52 acquires information regarding a quality of a communication path between the transmission apparatus 50 and the monitoring apparatus 30 (S21). For example, the communication quality acquisition unit 52 acquires information regarding a transmission time from when the transmission apparatus 50 transmits the video data to when the monitoring apparatus 30 receives the video data. Furthermore, the communication quality acquisition unit 52 calculates an available bandwidth of the communication path after acquiring the information regarding the transmission time as the information regarding the quality of the communication path. The available bandwidth may be calculated by, for example, dividing the transmission time by the size of the transmitted video data.

Next, the reproduction environment acquisition unit 53 acquires the information regarding the reproduction environment in the monitoring apparatus from the monitoring apparatus 30 via the communication unit 51 (S22). For example, the reproduction environment acquisition unit 53 may be the information regarding the screen display in the monitoring apparatus 30, the line of sight of the monitoring person, the reproduction delay, and the like.

Next, the priority level determination unit 55 determines the priority levels of the cameras 61 to 64 (S23). For example, the priority level determination unit 55 may determine the priority level of the camera 61 as 4, determine the priority level of the camera 62 as 3, determine the priority level of the camera 63 as 2, and determine the priority level of the camera 64 as 1 based on the traveling direction of the vehicle. Here, the larger the numerical value of the priority level is, the more important the camera is. The important camera indicates that a video captured by the camera is more important than a video captured by another camera.

Next, the quality-of-experience calculation unit 56 calculates the quality q of experience of the monitoring person when the monitoring person views the video captured by each camera, by using the information acquired from the encoding control unit 54 as a parameter. The encoding control unit 54 outputs the information acquired from the communication quality acquisition unit 52 and the reproduction environment acquisition unit 53 to the quality-of-experience calculation unit 56. Furthermore, the encoding control unit 54 may output the bit rates and the frame rates allocated to the cameras 61 to 64 and the resolutions and the codec types of the videos captured by the cameras 61 to 64 to the quality-of-experience calculation unit 56. Furthermore, the encoding control unit 54 may output installation locations of the cameras 61 to 64, orientations of the cameras 61 to 64, camera types, a vehicle speed, operation information of the vehicle, and the like to the quality-of-experience calculation unit 56.

Next, the encoding control unit 54 determines the encoding parameter by using the quality q of experience acquired from the quality-of-experience calculation unit 56 and the priority level p acquired from the priority level determination unit 55.

Next, a flow of encoding parameter determination processing according to the second example embodiment will be described with reference to FIG. 8. In FIG. 8, a flow of processing for determining a bandwidth to be allocated to each camera will be described. FIG. 8 shows detailed processing related to Steps S24 and S25 of FIG. 7.

First, the encoding control unit 54 calculates a value of an objective function in a case where bandwidths to be allocated to the cameras 61 to 64 are increased by a predetermined amount (S31). For example, $p_1$ in Equation (1) is the priority level of the camera 61, and $q_1$ is the quality of experience for the camera 61. Further, $p_2$ is the priority level of the camera 62, $q_2$ is the quality of experience for the camera 62, $p_3$ is the priority level of the camera 63, $q_3$ is the quality of experience for the camera 63, $p_4$ is the priority level of the camera 64, and $q_4$ is the quality of experience for the camera 64.

For example, the encoding control unit 54 calculates the quality of experience for the camera 61 in a case where 100 kbps is allocated to the camera 61, and calculates the value of the objective function by using the calculated quality of experience and the priority level. Similarly, a value of an objective function in a case where 100 kbps is allocated to the camera 62, a value of an objective function in a case where 100 kbps is allocated to the camera 63, and a value of an objective function in a case where 100 kbps is allocated to the camera 64 are calculated. The priority level $p_i$ is a value determined in Step S23 of FIG. 7. The quality $q_i$ of experience is uniquely determined, for example, in a case where the bandwidth (bit rate) is determined using the graph showing the relationship between the quality of experience and the bandwidth shown in FIG. 5. Even when the bit rates are the same, in a case where the quality of experience varies depending on the frame rate, the resolution, and the like, the encoding control unit 54 may adjust the frame rate, the resolution, and the like in such a way that the quality of experience is maximized at the corresponding bit rate.

The encoding control unit 54 compares the values of the respective objective functions, and determines a camera to which a bandwidth is to be allocated (S32). For example, in a case where the objective function in a case where 100 kbps is allocated to the camera 61 is larger than the objective function in a case where 100 kbps is allocated to another camera, the encoding control unit 54 determines to allocate 100 kbps to the camera 61.

Next, the encoding control unit 54 determines whether or not a total bandwidth of the respective cameras is smaller than the available bandwidth (S33). As the available bandwidth, the value calculated by the communication quality acquisition unit 52 in Step S21 of FIG. 7 is used. Specifically, a case where it is determined in Step S32 to allocate 100 kbps to the camera 61 will be described. In this case, 100 kbps is allocated to the camera 61, and no bandwidth is allocated to the other cameras, and thus, the total bandwidth of the respective cameras is 100 kbps. In a case where the encoding control unit 54 determines that the total bandwidth of the respective cameras is smaller than the available bandwidth, the processing of Step S31 and subsequent steps is repeated. Furthermore, in a case where a difference between the available bandwidth and the total bandwidth of the respective cameras is less than 100 kbps which is a predetermined increase amount, the encoding control unit 54 may set the difference between the available bandwidth and the total bandwidth of the respective cameras as the predetermined increase amount in Step S31 and subsequent steps.

Specifically, it is assumed that the encoding control unit 54 determines to allocate 100 kps to the camera 61 in the first Step S32. In this case, in Step S31 repeatedly performed after Step S33, the encoding control unit 54 calculates the quality of experience when 200 kbps is allocated to the camera 61 in a state where no bandwidth is allocated to the cameras 62 to 64, and calculates the value of the objective function. Further, the encoding control unit 54 calculates the value of each objective function when 100 kbps is allocated to each of the cameras 62 to 64 in a state where 100 kbps is allocated to the camera 61.

In a case where it is determined in Step S32 that the total bandwidth of the respective cameras has reached the available bandwidth, the encoding control unit 54 ends the encoding parameter determination processing.

As described above, the transmission apparatus 50 according to the second example embodiment can determine the bandwidth to be applied to the video data of the videos captured by the plurality of cameras in consideration of the priority level and the quality of experience. That is, by considering the quality of experience, the transmission apparatus 50 can prevent excessive bandwidth allocation to video data of a video captured by a camera with a high priority level.

In addition, the encoding control unit 54 may use an objective function A2 in Equation (3) defined as follows instead of the objective function A1. The encoding control unit 54 may determine the encoding parameter in such a way that A2 is maximized under the constraint condition B.

[Equation 3]

$$A2 = \max \frac{\sum_{i=1}^{n} p_i q_i}{\sum_{i=1}^{n} r_i} \quad (3)$$

The objective function A2 is used to determine a bandwidth to be allocated to each camera in such a way that the value of the objective function A1 per bit is maximized.

In addition, an upper limit of the bandwidth to be allocated to each camera may be determined as in Equation (4). $q_{UB}$ represents an upper limit value of the quality of experience.

[Equation 4]

$$q_i \leq q_{UB} \quad (4)$$

In a case where the bandwidth to be allocated is increased and the quality of experience reaches $q_{UB}$, the allocation of the bandwidth to the camera may be stopped.

In addition, the communication quality acquisition unit 52 may subtract, from the calculated available bandwidth, a bandwidth to be allocated to communication other than communication for transmitting the video data of the videos captured by the cameras 61 to 64 to the monitoring apparatus 30. The communication other than the communication for transmitting the video data may be, for example, communication for transmitting sensor data detected by another sensor mounted on the transmission apparatus 50. Alternatively, the communication other than the communication for transmitting the video data may be communication related to an application used by a user in the vehicle.

The communication quality acquisition unit 52 may output, to the encoding control unit 54, a value obtained by subtracting the bandwidth to be allocated to the communication other than the communication for transmitting the video data from the calculated available bandwidth. In Step S33 of FIG. 8, the encoding control unit 54 may determine whether or not the total bandwidth of the respective cameras exceeds the value obtained by subtracting the bandwidth to be allocated to the communication other than the communication for transmitting the video data from the available bandwidth.

As a result, the transmission apparatus 50 can transmit the video data and other data according to the quality desired by the monitoring person of the monitoring apparatus 30 or the like.

Furthermore, the encoding parameter determination processing in FIG. 8 may be used to determine a bandwidth to be allocated when data generated in an apparatus other than a camera, such as a sensor, is transmitted, in addition to data generated in the camera. Further, in a case where communication for transmitting video data has a higher priority level than that of communication for transmitting data detected in a sensor, a bandwidth may be preferentially allocated to the camera, and then a bandwidth may be allocated to the sensor.

Figure 7:
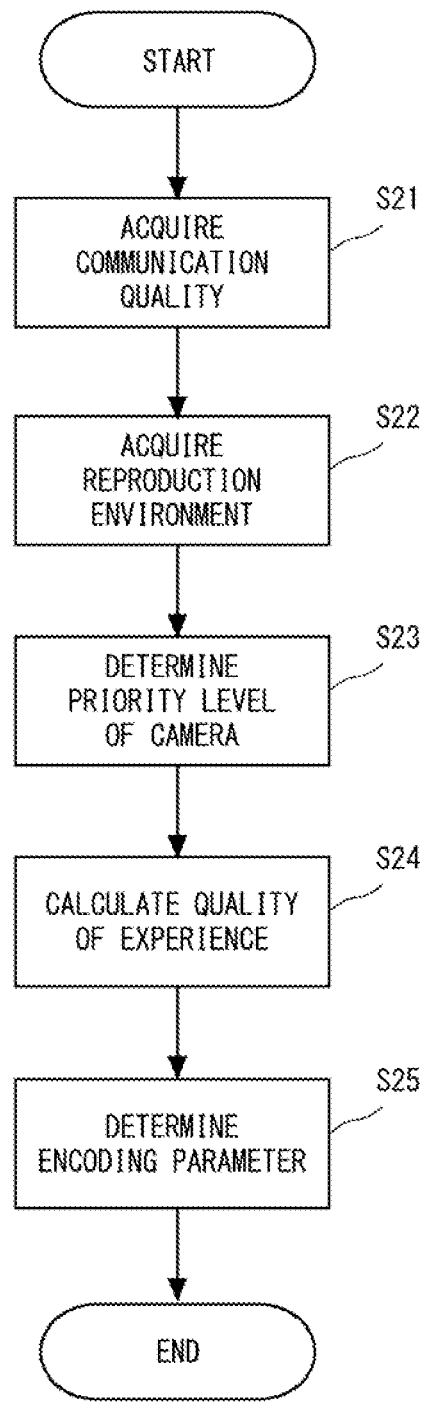
FIG. 7 is a diagram showing a flow of communication control processing according to the second example embodiment.
Figure 8:
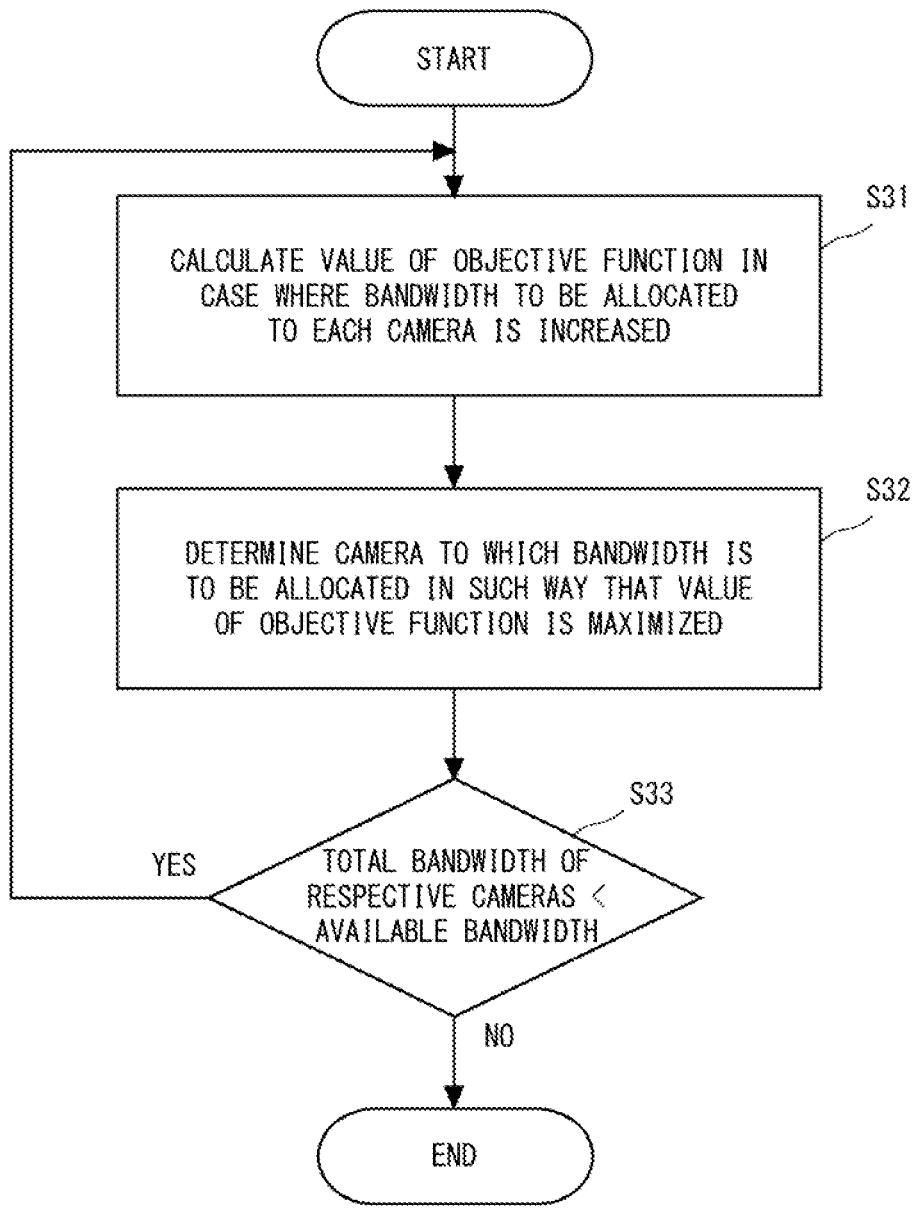
FIG. 8 is a diagram showing a flow of bandwidth allocation processing according to the second example embodiment.

Furthermore, the transmission apparatus 50 may periodically perform the communication control processing of FIG. 7 and the encoding parameter determination processing of FIG. 8, or may perform the communication control processing and the encoding parameter determination processing when the available bandwidth greatly varies. The term "periodically" may mean, for example, a cycle of several hundred milliseconds to several seconds (typically one second). As a result, the transmission apparatus 50 can change the encoding parameter to be applied to the video data of the videos captured by the cameras 61 to 64 according to the change in radio quality or the like. Alternatively, the transmission apparatus 50 may perform the communication control processing of FIG. 7 and the encoding parameter determination processing of FIG. 8 according to the operation of the vehicle. For example, the transmission apparatus 50 may perform the processings of FIGS. 7 and 8 at a timing when it is determined that the vehicle turns right or left. In a case where the vehicle is a self-driving vehicle, it may be found that the vehicle turns right or left from the operation of the self-driving vehicle or a planned travel route, and in a case where the vehicle is a vehicle for which remote monitoring or driving assistance is performed, it may be found that the vehicle turns right or left at a timing when a blinker is turned on.

Third Example Embodiment

Figure 9:
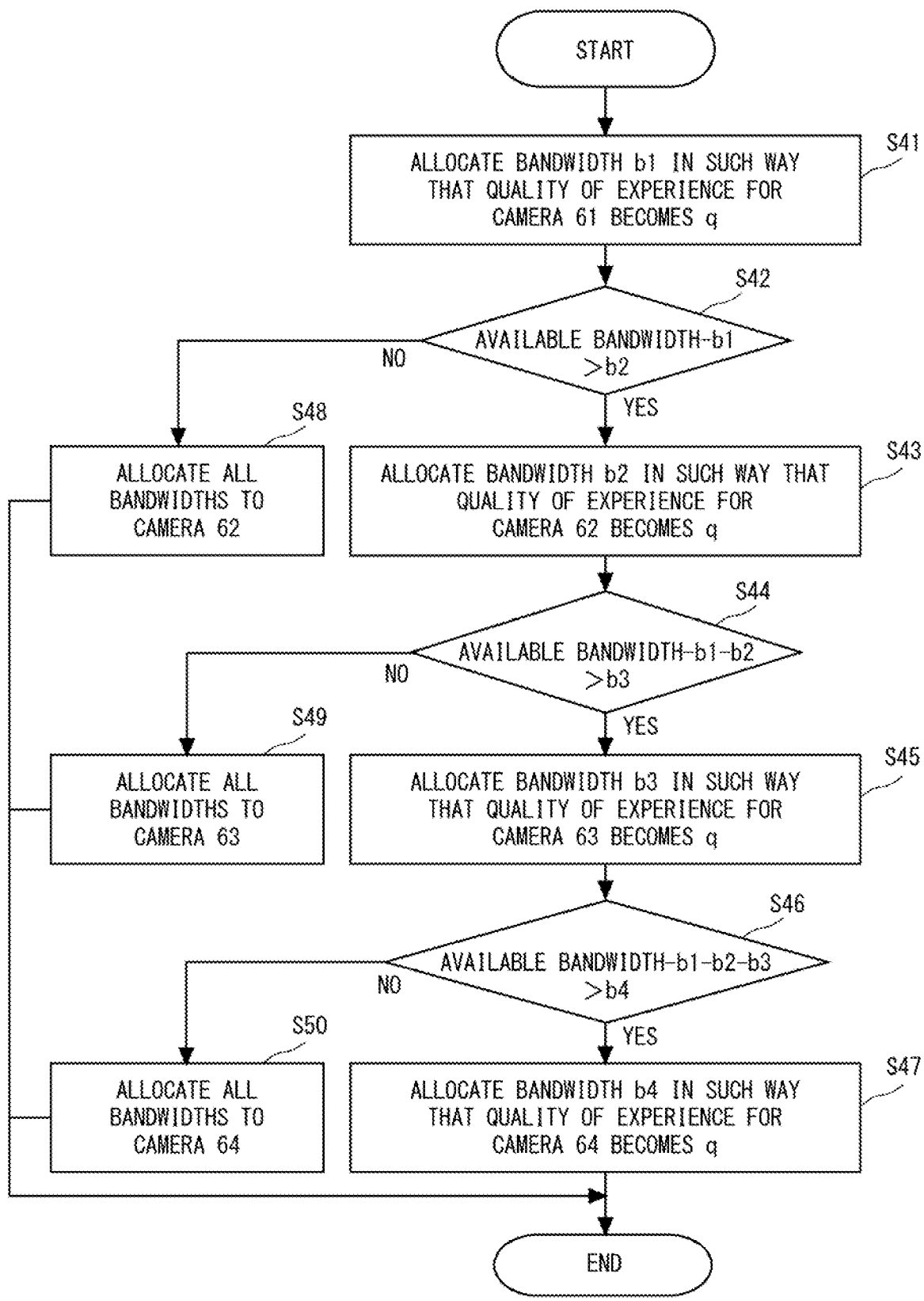
FIG. 9 is a diagram showing a flow of bandwidth allocation processing according to a third example embodiment.

Next, a flow of encoding parameter determination processing according to a third example embodiment will be described with reference to FIG. 9. In FIG. 9, a flow of processing for determining a bandwidth to be allocated to each camera will be described. FIG. 9 shows detailed processing related to Steps S24 and S25 of FIG. 7. In FIG. 9, the encoding control unit 54 uses a priority order as the priority information of the cameras 61 to 64. Here, it is assumed that the camera 61 has the highest priority, the camera 62 has the second highest priority, the camera 63 has the third highest priority, and the camera 64 has the fourth highest priority. The priority order of each camera is determined by the priority level determination unit 55 in Step S23 of FIG. 7.

First, the encoding control unit 54 allocates a bandwidth b1 in such a way that the quality of experience for the camera 61 becomes q (S41). Here, a graph indicating a relationship between a bandwidth b and the quality q of experience may be determined for each video of a camera. The graph showing the relationship between the bandwidth b and the quality q of experience may be similar to FIG. 5. In this case, it is assumed that the bandwidth b1 allocated in such a way that the quality of experience when viewing the video of the camera 61 becomes q follows a graph indicating a relationship between the bandwidth b and the quality q of experience for the camera 61. Next, the encoding control unit 54 determines whether or not a value obtained by subtracting the bandwidth b1 from the available bandwidth calculated in Step S21 of FIG. 7 exceeds a bandwidth b2 (S42). The bandwidth b2 is a bandwidth allocated in such a way that the quality of experience when viewing the video of the camera 62 becomes q.

In Step S42, in a case where the encoding control unit 54 determines that the value obtained by subtracting the bandwidth b1 from the available bandwidth exceeds the bandwidth b2, the bandwidth b2 is allocated in such a way that the quality of experience for the camera 62 becomes q (S43).

Next, the encoding control unit 54 determines whether or not a value obtained by subtracting the bandwidths b1 and b2 from the available bandwidth calculated in Step S21 of FIG. 7 exceeds a bandwidth b3 (S44). The bandwidth b3 is a bandwidth to be allocated in a such way that the quality of experience when viewing the video of the camera 63 becomes q.

In Step S44, in a case where the encoding control unit 54 determines that the value obtained by subtracting the bandwidths b1 and b2 from the available bandwidth exceeds the bandwidth b3, the bandwidth b3 is allocated in such a way that the quality of experience for the camera 63 becomes q (S45).

Next, the encoding control unit 54 determines whether or not a value obtained by subtracting the bandwidths b1, b2, and b3 from the available bandwidth calculated in Step S21 of FIG. 7 exceeds a bandwidth b4 (S46). The bandwidth b4 is a bandwidth allocated in such a way that the quality of experience when viewing the video of the camera 64 becomes q.

In Step S46, in a case where the encoding control unit 54 determines that the value obtained by subtracting the bandwidths b1, b2, and b3 from the available bandwidth exceeds the bandwidth b4, the bandwidth b4 is allocated in such a way that the quality of experience for the camera 64 becomes q (S47).

In Step S42, in a case where the encoding control unit 54 determines that the value obtained by subtracting the bandwidth b1 from the available bandwidth does not exceed the bandwidth b2, all bandwidths that can be allocated are allocated to the camera 62 (S48). The value obtained by subtracting the bandwidth b1 from the available bandwidth does not exceed the bandwidth b2, which indicates that the value obtained by subtracting the bandwidth b1 from the available bandwidth is smaller than the bandwidth b2.

In Step S44, in a case where the encoding control unit 54 determines that the value obtained by subtracting the bandwidths b1 and b2 from the available bandwidth does not exceed the bandwidth b3, all bandwidths that can be allocated are allocated to the camera 63 (S49).

In Step S46, in a case where the encoding control unit 54 determines that the value obtained by subtracting the bandwidths b1, b2, and b3 from the available bandwidth does not exceed the bandwidth b4, all bandwidths that can be allocated are allocated to the camera 64 (S50).

Although a case where the cameras 61 to 64 have different priorities has been described in FIG. 9, but for example, the cameras 62 and 63 may have the same priority. In such a case, for example, in Step S42 of FIG. 9, the encoding control unit 54 may determine whether or not the value obtained by subtracting the bandwidth b1 from the available bandwidth exceeds twice the bandwidth b2. In a case where the encoding control unit 54 determines that the value obtained by subtracting the bandwidth b1 from the available bandwidth exceeds bandwidth b2×2, the bandwidth b2 is allocated to the cameras 62 and 63 having the same priority. In a case where the encoding control unit 54 determines that the value obtained by subtracting the bandwidth b1 from the available bandwidth does not exceed bandwidth b2×2, bandwidths corresponding to a half of the remaining bandwidths are allocated to the camera 62 and the camera 63, respectively.

Alternatively, in Steps S42, S44, and S46, in a case where the encoding control unit 54 determines that the remaining bandwidths do not exceed the bandwidth b2, b3, or b4, the processing may be terminated without allocating the remaining bandwidths.

Although a case where the bandwidths are allocated to the cameras 61 to 64 having different priorities in such a way as to obtain the same quality q of experience has been described in FIG. 9, the bandwidths may be allocated in such a way as to obtain different qualities of experience depending on the priority order. For example, the encoding control unit 54 may allocate a bandwidth in which the highest quality of experience is obtained to the camera 61 with the highest priority, and may allocate a bandwidth in which the lowest quality of experience is obtained to the camera 64 with the lowest priority.

As described above, the transmission apparatus 50 according to the third example embodiment can determine the bandwidth to be applied to the video data of the videos captured by the plurality of cameras in consideration of the priority order and the quality of experience. That is, by considering the quality of experience, the transmission apparatus 50 can prevent excessive bandwidth allocation to video data of a video captured by a camera with a high priority.

In addition, even in a case where a large number of bandwidths are allocated to a camera with a high priority to improve the quality of experience for the camera with a high priority, if the quality of experience regarding the videos of other cameras cannot be improved, the comprehensive quality of experience for the videos of all the cameras cannot be improved. Therefore, the transmission apparatus 50 can transmit the video data to the monitoring apparatus 30 in such a way as to enhance the comprehensive quality of experience for the videos of the plurality of cameras by allocating the bandwidth in such a way as to satisfy a predetermined quality of experience in descending order of priority.

Furthermore, it is possible to further improve the overall quality of experience for the videos of all the cameras by changing the quality of experience to be satisfied according to the priority order. For example, a video of a camera with a high priority can be said to be a video that is gazed more by the monitoring person than videos of other cameras. In such a case, by assigning the bandwidth such that the quality of experience regarding the video of the camera with high priority is higher than the quality of experience regarding videos of other cameras, it is possible to enhance the overall quality of experience as compared with a case of performing control in such a way that the qualities of experience for all the cameras are the same.

Furthermore, the encoding control unit 54 may allocate a minimum bandwidth to the cameras 61 to 64 before performing Step S41, and then perform the processing of Step S41 and subsequent steps. As a result, the encoding control unit 54 can allocate a minimum bandwidth to each camera in order to transmit the video data to the monitoring apparatus 30.

In addition, similarly to the second example embodiment, in the transmission apparatus 50 according to the third example embodiment, the communication quality acquisition unit 52 may subtract, from the calculated available bandwidth, a bandwidth to be allocated to communication other than communication for transmitting the video data of the videos captured by the cameras 61 to 64 to the monitoring apparatus 30. For example, in Steps S42, S44, and S46 of FIG. 9, the encoding control unit 54 may subtract, from the available bandwidth, the bandwidth b allocated to each camera and the bandwidth allocated to communication other than video data communication.

Furthermore, the transmission apparatus 50 may periodically perform the encoding parameter determination processing of FIG. 9, or may perform the encoding parameter determination processing when the available bandwidth greatly varies. As a result, the transmission apparatus 50 can change the encoding parameter to be applied to the video data of the videos captured by the cameras 61 to 64 according to the change in radio quality or the like.

Figure 10:
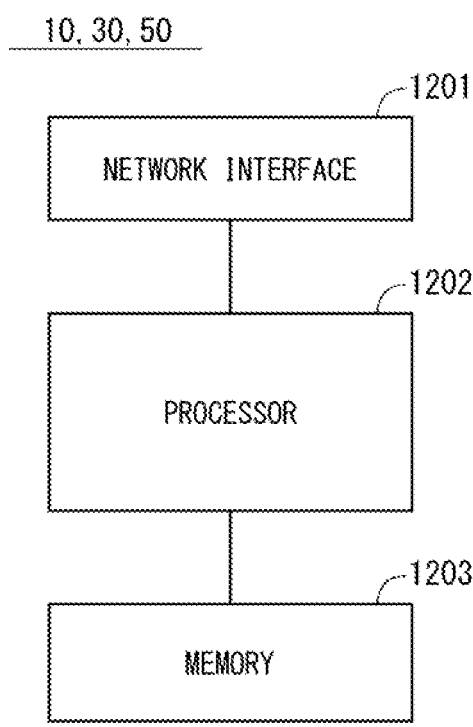
FIG. 10 is a configuration diagram of a transmission apparatus and a monitoring apparatus according to each example embodiment.

FIG. 10 is a block diagram showing configuration examples of the transmission apparatus 10, the monitoring apparatus 30, and the transmission apparatus 50 (hereinafter, referred to as the transmission apparatus 10 or the like). Referring to FIG. 10, the transmission apparatus 10 or the like includes a network interface 1201, a processor 1202, and a memory 1203. The network interface 1201 is used to communicate with a network node (for example, eNB, MME, or P-GW). The network interface 1201 may include, for example, a network interface card (NIC) conforming to IEEE 802.3 series. Here, the eNB represents an evolved node B, the MME represents a mobility management entity, and the P-GW represents a packet data network gateway. IEEE represents Institute of Electrical and Electronics Engineers.

The processor 1202 reads and executes software (computer program) from the memory 1203 to perform processing of a video transmission terminal 10 or the like described with reference to the flowcharts in the above-described example embodiments. The processor 1202 may be, for example, a microprocessor, a micro processing unit (MPU), or a central processing unit (CPU). The processor 1202 may include a plurality of processors.

The memory 1203 is implemented by a combination of a volatile memory and a nonvolatile memory. The memory 1203 may include a storage disposed away from the processor 1202. In this case, the processor 1202 may access the memory 1203 through an input/output (I/O) interface (not shown).

In the example of FIG. 10, the memory 1203 is used to store a software module group. The processor 1202 can perform the processing in the transmission apparatus 10 or the like described in the above-described example embodiments by reading and executing these software module groups from the memory 1203.

As described with reference to FIG. 10, each of the processors included in the transmission apparatus 10 or the like in the above-described example embodiments executes one or more programs including a command group for causing a computer to perform the algorithm described with reference to the drawings.

In the above example, the program can be stored using various types of non-transitory computer-readable media and supplied to a computer. The non-transitory computer-readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a compact disc-read only memory (CD-ROM), a CD-R, a CD-R/W, and a semiconductor memory such as a mask ROM, a programmable ROM (PROM), an erasable PROM (EPROM), a flash ROM, or a random access memory (RAM). In addition, the program may be supplied to the computer by various types of transitory computer-readable media. Examples of the transitory computer-readable medium include electric signals, optical signals, and electromagnetic waves. The transitory computer-readable medium can provide the program to the computer via a wired communication line such as electric wires and optical fibers or a wireless communication line.

Note that the present disclosure is not limited to the above example embodiments, and can be appropriately changed without departing from the gist.

Although the invention of the present application has been described above with reference to the example embodiments, the invention of the present application is not limited to the above. Various modifications that can be understood by those skilled in the art can be made to the configuration and details of the invention of the present application within the scope of the invention.

Note that the present disclosure is not limited to the above example embodiments, and can be appropriately changed without departing from the gist.

Some or all of the above example embodiments may be described as the following supplementary notes but are not limited to the following.

(Supplementary Note 1)

A communication control method in a transmission apparatus, the communication control method including:

estimating a quality of experience of a monitoring person who monitors videos displayed on a monitoring apparatus that has received video data of the videos captured by a plurality of imaging apparatuses via a network, when viewing the videos; and controlling communication for transmitting the video captured by each of the imaging apparatuses to the monitoring apparatus via the network based on the estimated quality of experience.

(Supplementary Note 2)

The communication control method according to Supplementary Note 1, in which the imaging apparatus and the transmission apparatus are mounted on a mobile body, and the quality of experience is determined based on a state of the mobile body.

(Supplementary Note 3)

The communication control method according to Supplementary Note 1 or 2, in which in the controlling of the communication, an encoding parameter of the video captured by each of the imaging apparatuses is controlled.

(Supplementary Note 4)

The communication control method according to Supplementary Note 3, in which the encoding parameter includes a bit rate of the video.

(Supplementary Note 5)

The communication control method according to any one of Supplementary Notes 1 to 4, in which in the controlling of the communication, the communication is controlled based on priority information of each of the imaging apparatuses and the quality of experience.

(Supplementary Note 6)

The communication control method according to Supplementary Note 5, in which the priority information indicates a priority level, which is a value allocated to each of the imaging apparatuses, or a priority order of the imaging apparatuses.

(Supplementary Note 7)

A communication system including:

a transmission apparatus configured to transmit, via a network, video data of videos captured by a plurality of imaging apparatuses; and a monitoring apparatus configured to display the videos received via the network, in which the transmission apparatus estimates a quality of experience of a monitoring person who monitors the videos when viewing the videos, and controls communication for transmitting the video captured by each of the imaging apparatuses to the monitoring apparatus via the network based on the estimated quality of experience.

(Supplementary Note 8)

The communication system according to Supplementary Note 7, in which the imaging apparatus and the transmission apparatus are mounted on a mobile body, and the quality of experience is determined based on a state of the mobile body.

(Supplementary Note 9)

The communication system according to Supplementary Note 7 or 8, in which the transmission apparatus controls an encoding parameter of the video captured by each of the imaging apparatuses.

(Supplementary Note 10)

The communication system according to Supplementary Note 9, in which the encoding parameter includes a bit rate of the video.

(Supplementary Note 11)

The communication system according to any one of Supplementary Notes 7 to 10, in which the transmission apparatus controls the communication based on priority information of each of the imaging apparatuses and the quality of experience.

(Supplementary Note 12)

The communication system according to Supplementary Note 11, in which the priority information indicates a priority level, which is a value allocated to each of the imaging apparatuses, or a priority order of the imaging apparatuses.

(Supplementary Note 13)

A transmission apparatus including:

an estimation unit configured to estimate a quality of experience of a monitoring person who monitors videos displayed on a monitoring apparatus that has received video data of the videos captured by a plurality of imaging apparatuses via a network, when viewing the videos; and a communication control unit configured to control communication for transmitting the video captured by each of the imaging apparatuses to the monitoring apparatus via the network based on the estimated quality of experience.

(Supplementary Note 14)

The transmission apparatus according to Supplementary Note 13, in which the imaging apparatus and the transmission apparatus are mounted on a mobile body, and the quality of experience is determined based on a state of the mobile body.

(Supplementary Note 15)

The transmission apparatus according to Supplementary Note 13 or 14, in which the communication control unit controls an encoding parameter of the video captured by each of the imaging apparatuses.

(Supplementary Note 16)

The transmission apparatus according to Supplementary Note 15, in which the encoding parameter includes a bit rate of the video.

(Supplementary Note 17)

The transmission apparatus according to any one of Supplementary Notes 13 to 16, in which the communication control unit controls the communication based on priority information of each of the imaging apparatuses and the quality of experience.

(Supplementary Note 18)

The transmission apparatus according to Supplementary Note 17, in which the priority information indicates a priority level, which is a value allocated to each of the imaging apparatuses, or a priority order of the imaging apparatuses.

REFERENCE SIGNS LIST

10 TRANSMISSION APPARATUS
11 ESTIMATION UNIT
12 COMMUNICATION CONTROL UNIT
20 IMAGING APPARATUS
30 MONITORING APPARATUS
31 REPRODUCING UNIT
32 COMMUNICATION UNIT
40 NETWORK
50 TRANSMISSION APPARATUS
51 COMMUNICATION UNIT
52 COMMUNICATION QUALITY ACQUISITION UNIT
53 REPRODUCTION ENVIRONMENT ACQUISITION UNIT
54 ENCODING CONTROL UNIT
55 PRIORITY LEVEL DETERMINATION UNIT
56 QUALITY-OF-EXPERIENCE CALCULATION UNIT
57 ENCODING UNIT
58 ENCODING UNIT
59 ENCODING UNIT
60 ENCODING UNIT
61 CAMERA
62 CAMERA
63 CAMERA
64 CAMERA

What is claimed is:

1. A communication control method in a transmission apparatus, the communication control method comprising:
estimating a quality of experience of a monitoring person who simultaneously monitors videos displayed on a monitoring apparatus that has received video data of the videos captured by a plurality of imaging apparatuses via a network, when viewing the videos; and
controlling communication for transmitting the video captured by each of the imaging apparatuses to the monitoring apparatus via the network based on the estimated quality of experience.

2. The communication control method according to claim 1, wherein
the imaging apparatus and the transmission apparatus are mounted on a mobile body, and
the quality of experience is determined based on a state of the mobile body.

3. The communication control method according to claim 1, wherein in the controlling of the communication, an encoding parameter of the video captured by each of the imaging apparatuses is controlled.

4. The communication control method according to claim 3, wherein the encoding parameter includes a bit rate of the video.

5. The communication control method according to claim 1, further comprising calculating, based on each parameter allocated to each of the imaging apparatuses, each of one or more quality of experiences corresponding to each of the imaging apparatuses, wherein the estimated quality of experience is estimated by weighing each of the calculated quality of experiences based on priority information of each of the imaging apparatuses and summing the weighted quality of experiences up.

6. The communication control method according to claim 5, wherein the priority information indicates a priority level, which is a value allocated to each of the imaging apparatuses, or a priority order of the imaging apparatuses.

7. A communication system comprising:
a transmission apparatus configured to transmit, via a network, video data of videos captured by a plurality of imaging apparatuses; and
a monitoring apparatus configured to display the videos received via the network,
wherein the transmission apparatus is configured to
estimates a quality of experience of a monitoring person who simultaneously monitors the videos when viewing the videos, and
controls communication for transmitting the video captured by each of the imaging apparatuses to the monitoring apparatus via the network based on the estimated quality of experience.

8. The communication system according to claim 7, wherein
the imaging apparatus and the transmission apparatus are mounted on a mobile body, and
the quality of experience is determined based on a state of the mobile body.

9. The communication system according to claim 7, wherein the transmission apparatus is configured to control an encoding parameter of the video captured by each of the imaging apparatuses.

10. The communication system according to claim 9, wherein the encoding parameter includes a bit rate of the video.

11. The communication system according to claim 7, wherein the transmission apparatus is configured to calculate each of one or more quality of experiences corresponding to each of the imaging apparatuses based on each parameter allocated to each of the imaging apparatuses, wherein the estimated quality of experience is estimated by weighing each of the calculated quality of experiences based on priority information of each of the imaging apparatuses and summing the weighted quality of experiences up.

12. The communication system according to claim 11, wherein the priority information indicates a priority level, which is a value allocated to each of the imaging apparatuses, or a priority order of the imaging apparatuses.

13. A transmission apparatus comprising:
at least one memory storing instructions, and
at least one processor configured to execute the instructions to;
estimate a quality of experience of a monitoring person who simultaneously monitors videos displayed on a monitoring apparatus that has received video data of the videos captured by a plurality of imaging apparatuses via a network, when viewing the videos; and
control communication for transmitting the video captured by each of the imaging apparatuses to the monitoring apparatus via the network based on the estimated quality of experience.

14. The transmission apparatus according to claim 13, wherein
the imaging apparatus and the transmission apparatus are mounted on a mobile body, and
the quality of experience is determined based on a state of the mobile body.

15. The transmission apparatus according to claim 13, wherein the at least one processor is further configured to execute the instructions to control an encoding parameter of the video captured by each of the imaging apparatuses.

16. The transmission apparatus according to claim 15, wherein the encoding parameter includes a bit rate of the video.

17. The transmission apparatus according to claim 16, wherein the at least one processor is further configured to execute the instructions to calculate each of one or more quality of experiences corresponding to each of the imaging apparatuses based on each parameter allocated to each of the imaging apparatuses and the estimated quality of experience is estimated by weighing each of the calculated quality of experiences based on priority information of each of the imaging apparatuses and summing the weighted quality of experiences up.

18. The transmission apparatus according to claim 17, wherein the priority information indicates a priority level, which is a value allocated to each of the imaging apparatuses, or a priority order of the imaging apparatuses.

* * * * *